United States Patent [19]
Higuchi et al.

[11] Patent Number: 5,654,778
[45] Date of Patent: Aug. 5, 1997

[54] IMAGE DISPLAY DEVICE HAVING TV AND VIDEO DEVICES

[75] Inventors: Yosio Higuchi; Kazuyuki Okada, both of Osaka, Japan

[73] Assignee: Funai Electric Co., Ltd., Osaka, Japan

[21] Appl. No.: 457,451

[22] Filed: Jun. 1, 1995

Related U.S. Application Data

[63] Continuation of Ser. No. 876,385, Apr. 30, 1992, abandoned.

[30] Foreign Application Priority Data

Nov. 6, 1991 [JP] Japan ................... 3-317331
Feb. 28, 1992 [JP] Japan ................... 4-079224

[51] Int. Cl.[6] .................................................. H04N 5/64
[52] U.S. Cl. .................... 348/836; 348/825; 361/752; 361/760
[58] Field of Search .................... 348/825, 830, 348/836, 790, 791; 361/395, 399, 400, 401, 736, 748, 752, 760, 761; 312/7.2; 340/815.52; 345/211, 212, 213

[56] References Cited

U.S. PATENT DOCUMENTS

| | | | |
|---|---|---|---|
| 5,023,726 | 6/1991 | Campisi | 348/839 |
| 5,053,881 | 10/1991 | Campisi | 358/254 |
| 5,094,513 | 3/1992 | Fukuda | 358/254 |

Primary Examiner—Thomas D. Lee
Attorney, Agent, or Firm—Keck, Mahin & Cate

[57] ABSTRACT

An image display device, having a casing in which a television device and a video device are enclosed, includes a main circuit board having a first area for installing electronic parts of a power supply circuit and a second area for installing remaining electronic parts for TV and video device. Since the electronic parts of the power supply circuit are arranged within a separated area formed on the main circuit board, the electronic parts for the TV device and the electronic parts for the video device can be installed with high density and with no substantial interference with each other.

4 Claims, 4 Drawing Sheets

LINES OF MAGNETIC FORCE

IMAGE DISPLAY DEVICE HAVING TV AND VIDEO DEVICES

This is a continuation of Ser. No. 07/876,385, filed on Apr. 30, 1992, abandoned.

THE BACKGROUND OF THE INVENTION

This invention relates to an image display device having a casing within which a television device and a video device are enclosed.

In FIGS. 1 and 2 are illustrated a conventional image display device having a casing within which a television device and a video device are enclosed. The video device 1 placed on a bottom plate 2a of a casing 2, as shown in FIG. 2, is secured at the front portion thereof to a front plate 2b of the casing 2 and at the rear portion thereof to a rear cabinet by means of screws 3, respectively.

The video device 1 includes a chassis 1a secured to a casing 1b of a molded plastic material. As shown in FIG. 2, a plurality of printed circuit boards 4 of the video device 1 are arranged at a rear portion of the chassis 1a or casing 1b.

A printed circuit board 5 of the TV device is disposed along one of the inner side surfaces of the casing 2, which bears a power supply circuit for the TV device including a high frequency transformer 6 for high voltage circuit. On one of the printed circuit boards 4 is provided separately a power supply circuit for the video device (not shown).

In FIG. 1, numeral 7 depicts a shield plate disposed above the video device 1.

As described above, the prior art image display device has a construction that the video device is inserted into the casing of the TV device and secured in position. Such construction, however, requires extremely large numbers of long wirings for connecting the printed circuit boards for the TV and video circuits. In addition, it takes a lot of time and labor to install the printed circuit boards for the TV and video circuits.

Furthermore, since the power supply circuits are provided separately for the TV and video circuits, it is necessary to install a large number of parts therefor. A further disadvantage is that noises generated from the power supply circuit for the TV circuit would be transmitted to the video device.

OBJECTS OF THE INVENTION

It is an object of this invention to provide an image display device having a TV and video device in a common casing, which eliminates the disadvantages as described above.

SUMMARY OF THE INVENTION

According to this invention, there is provided a display device having a casing in which a television device and a video device are enclosed, comprising:
 a main circuit board having a first area for installing electronic parts of an electron beam controlling circuit for a CRT and a power supply circuit for said television device and electronic parts of a power supply circuit for said video device, and a second area for installing electronic parts of said television device except for said electron beam controlling circuit and said power supply circuit for said television device and electronic parts of said video device except for said power supply circuit for said video device; and
 terminals for commercial AC power sources and terminals for said electron beam controlling circuit for CRT provided within said first area of said main circuit board.

According to this invention, since the electronic parts of the power supply circuit are arranged within a separated area formed on the main circuit board, the electronic parts for the TV device and the electronic parts for the video device can be installed with high density. For such arrangements, the TV and video circuits can be prevented from being subjected to interference from the power supply circuit, such as electrical noises, magnetic field and heat. Therefore, the shield for protecting the TV and video circuits from such influences can be eliminated.

In a preferred embodiment of this invention, the electronic parts of the power supply circuit arranged in the first area are commonly used for the television device and the video device, thereby reducing the number of necessary parts and overall size, compared to the conventional image display device.

It is preferable that electrical connection between the circuits for the television device and for the video device be done by a printed circuit, resulting in noise-free connection with a compact arrangement.

Preferably, the power supply circuit comprises a switching regulator circuit having a high frequency transformer arranged in such manner that a plane including a core gap of the transformer is disposed substantially in parallel with the surface of the main circuit board, thereby reducing the noise from the transformer to be picked up by the rotary video head.

Further features and advantages of the present invention will be apparent from the following description taken with reference to the accompanying drawings.

DETAILED DESCRIPTION

Figure 1:
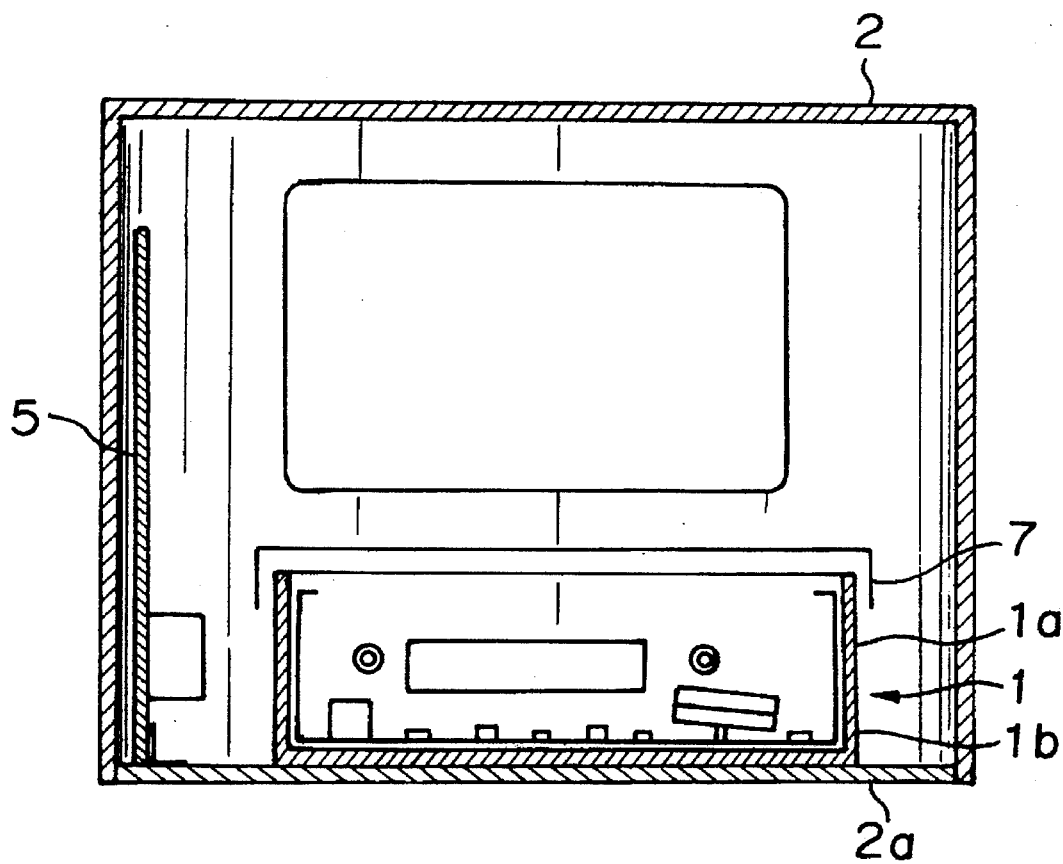
FIG. 1 is a cross sectional view of a conventional image display device having TV and video devices in a common casing.
Figure 2:
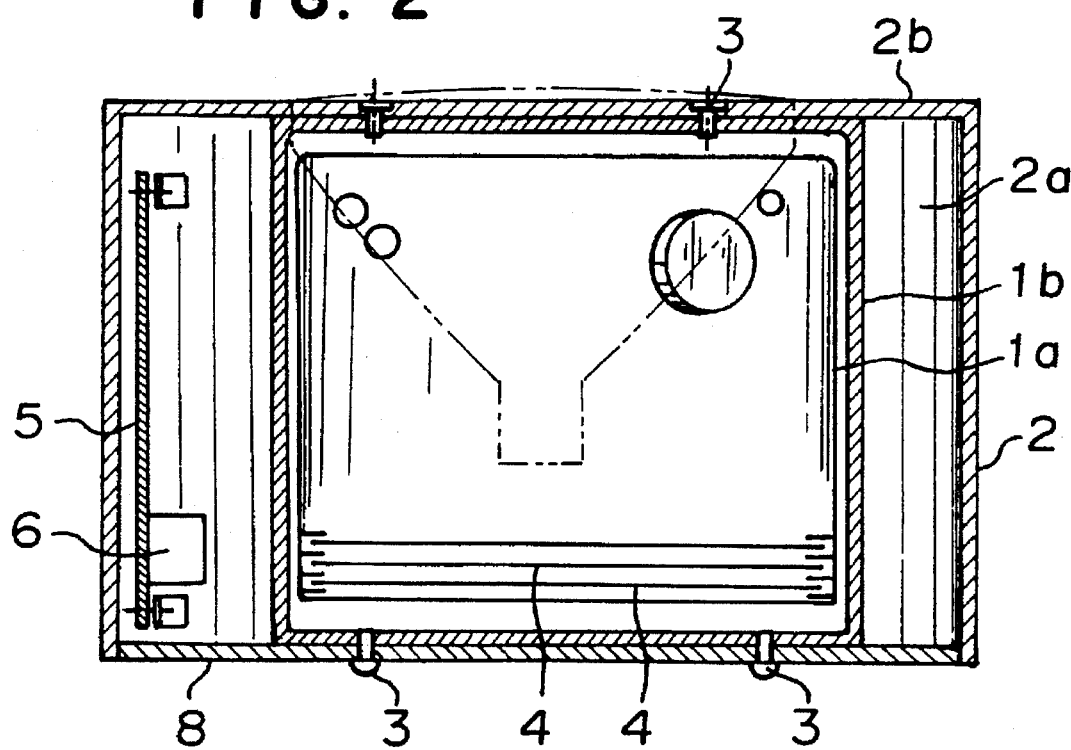
FIG. 2 is a sectional view in plan of the image display device shown in FIG. 1.
Figure 3:
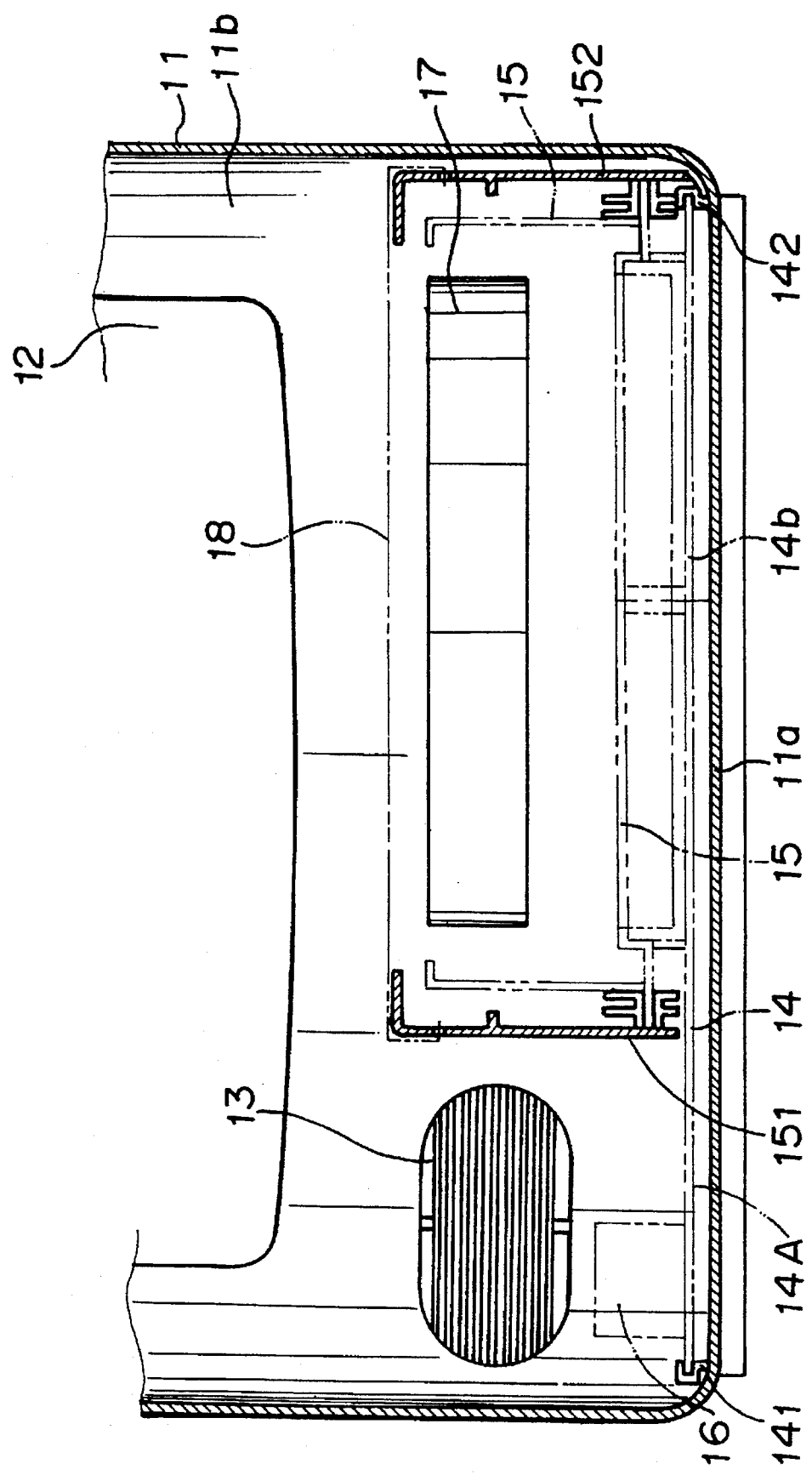
FIG. 3 shows a rear view in cross section of an image display device embodying this invention.
Figure 4:
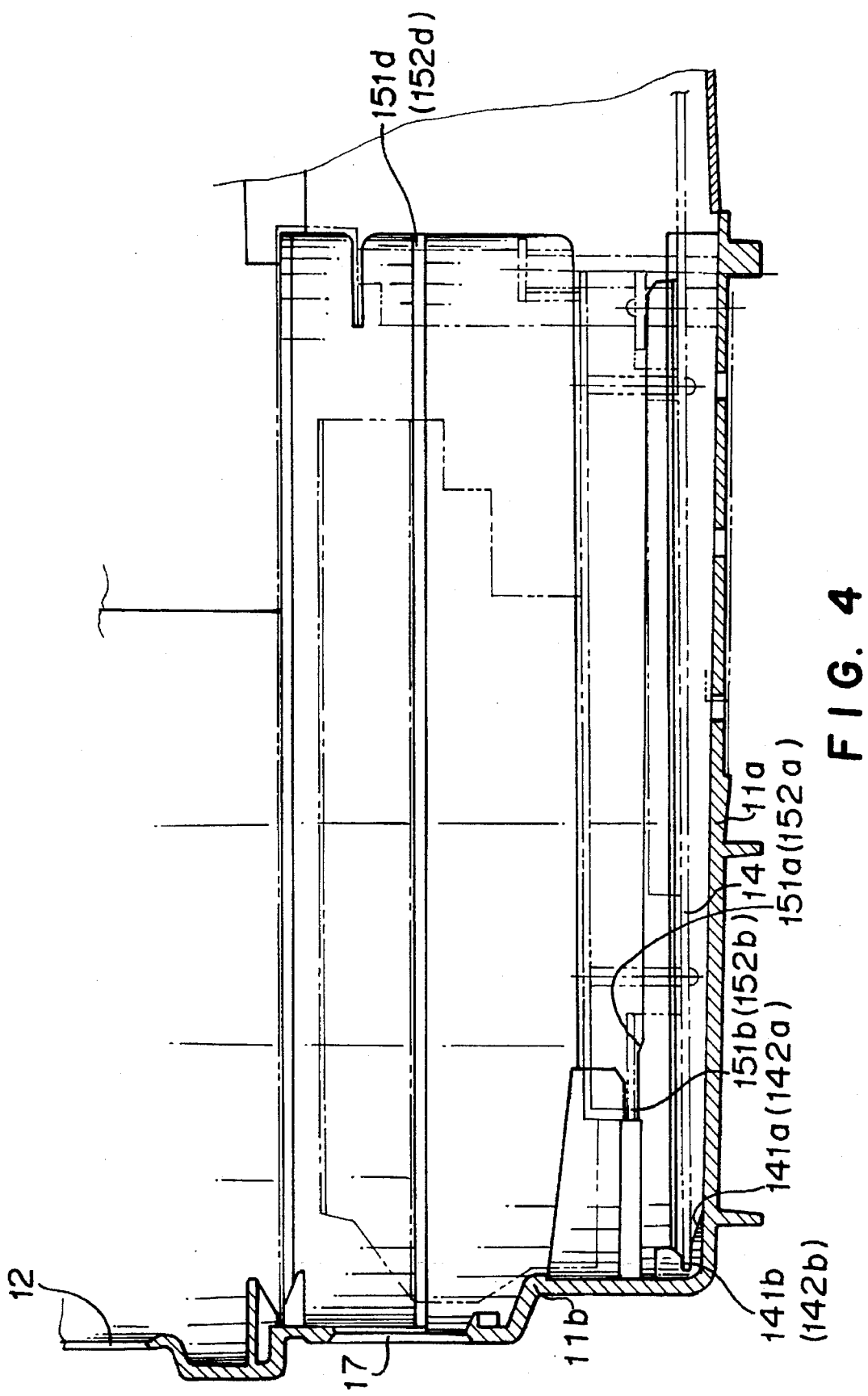
FIG. 4 shows a side view in cross section of the image display device shown in FIG. 3.

Referring now to FIGS. 3 and 4, reference numeral 11 depicts a casing of the image display device according to this invention, 12 a window for a CRT, 13 a port for a speaker, with both being provided in a front panel of the casing 12. A main circuit board 14 includes a power supply area 14A and a predetermined area 14B provided for installing various electronic parts. 141 and 142 denote respectively guides for the main circuit board.

A chassis 15 for installing various parts of the video mechanism is supported by chassis guides 151, 152 which are formed integrally with a front panel 11b of the casing 11 and disposed in a plane parallel with the upper surface of a bottom plate 11a.

Preferably, the chassis guide 151 is provided with a tapered introductory portion 151a at the proximal end and a support portion at the distal end, respectively. Similar introductory portion 152a and a support portion 152b are also formed at the proximal and distal ends of the guide 152, respectively.

Also, at the portion near the front panel 11b, the guides 141 and 142 for the main circuit board are provided with introductory portions 141a, 142a and support portion 141b, 142b, respectively.

Upper guides 151d and 152d for supporting the central portion of the chassis 15 are formed at the central portions of the chassis guides 151 and 152, respectively, and disposed in parallel with the upper surface of the bottom plate 11a. Numeral 16 depicts a high frequency transformer, 17 a port for a video cassette tape, and 18 a shield plate.

On the chassis 15 are installed necessary parts of the video mechanism, such as a video head cylinder and the like.

In this specific embodiment, as shown in FIG. 3, the area 14a of the main circuit board 14 is formed to occupy one fourth the entire area of the board from the left side viewing from the rear side of the casing. The parts for constituting the power supply circuit are installed in the area 14A. The remaining area 14B occupying three fourths the entire area of the board 14 is used to install the electronic parts except for the electron beam controlling circuit for CRT of the TV device and the electronic parts for the power supply circuit of the video device.

It is preferable that the video circuit and the TV circuit are mutually connected by a printed circuit and the like through the shortest path.

Within the power supply area 14A, the terminals for the commercial AC power supply and the terminals for the electron beam controlling circuit for the CRT are arranged to be separated from each other, and also a high voltage power supply including a high frequency transformer, and a low voltage power supply for TV and video device are equipped.

Preferably, a single low voltage power supply is used commonly for TV and video circuits, resulting in a decrease in the number of the parts to be used. The low voltage power supply is connected to the TV and video circuits through the shortest path by using a printed circuit.

Figure 5:
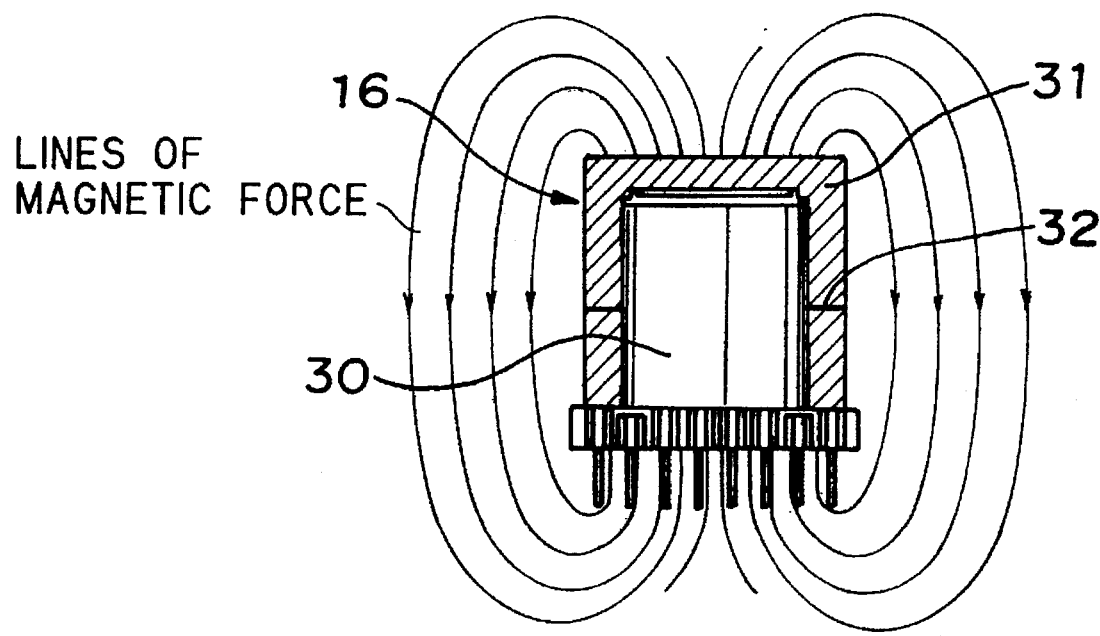
FIG. 5 is a longitudinal section of a high frequency transformer using the image display device shown in FIG. 3.
Figure 6:
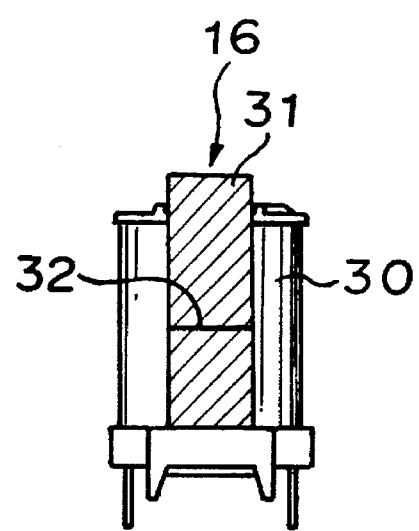
FIG. 6 is a side elevation of a high frequency transformer shown in FIG. 5.

Referring to FIGS. 5 and 6, a high frequency transformer 20 includes primary and secondary windings 30 and a core 31 with a core gap 32. The transformer 20 is preferably disposed in such manner that the plane on which the gap 32 is included is arranged in parallel with the surface of the main circuit board 14. In this arrangement, the lines of magnetic force run in the direction substantially perpendicular to the direction that the head gap of the video head cylinder is apt to pick up line of magnetic force, so that noises coming from the high frequency transformer can be reduced to a minimum level, thereby eliminating a magnetic shield around the high frequency transformer.

What is claimed is:

1. A video device comprising:

at least one circuit board;

a power supply device installed on a power supplying area of said at least one circuit board, said at least one circuit board including another area, other than said power supplying area, provided thereon;

a chassis on which parts of said video device are installed parallel to and above said at least one circuit board, said parts of said video device including at least a video head cylinder; and a high frequency transformer, provided with a core having primary and secondary windings and a core gap, installed on said power supplying area, said core gap included in a plane, the plane including said core gap being parallel to the at least one circuit board.

2. A video device as claimed in claim 1, and further comprising:

a casing in which said at least one circuit board and said chassis are installed;

a cathode ray tube installed in the casing; and terminals for an AC power supply and terminals for an electron beam controlling circuit for said cathode ray tube, separated from each other within said power supplying area, installed on said at least one circuit board;

said power supply device installed on said power supplying area comprising a high voltage power supply device having said high frequency transformer and a low voltage power supply device supplying low voltage power to a television device circuit and a video device circuit;

the other area provided on said circuit board being provided with said video device circuit and said television device circuit but not electronic parts on said power supplying area including said high voltage power supply device, said high frequency transformer and said low voltage power supply device.

3. An image displaying device provided with a television device and a video device in one casing comprising:

a first circuit board area provided with electronic parts, constituting an electron beam controlling circuit for a cathode ray tube and different electronic parts constituting at least one power supply circuit for supplying power to said television device and to said video device; and a second circuit board area provided with electronic parts of said television device and different electronic parts of said video device other than said electronic parts with which said first area is provided;

a video chassis housed within said one casing by which parts of said video device are installed in said one casing, said first circuit board area and said second circuit board area being disposed between said video chassis and an inner surface of said one casing; and a video head cylinder having a head gap installed on said video chassis and a high frequency transformer, included in the at least one power supply circuit, installed in said first circuit board area, said high frequency transformer being provided with a core, having first and second windings, and a core gap, said transformer being disposed so that a plane including said core gap is parallel to said first and second circuit board areas and magnetic flux flows in a direction so that the head gap of the video head cylinder installed on said video chassis does not pick up said magnetic flux.

4. An image displaying apparatus having a single housing in which a television device and a video device are contained, said television device including at least a high-frequency transformer, said video device including at least a head cylinder, said television device and said video device receiving a common voltage from a single low voltage power source, said image displaying apparatus comprising:

a video chassis housed within said single housing on which at least said head cylinder is installed at a first side of said housing;

a first area formed between said video chassis and an inner surface of said housing at a second side of said housing, said first area being provided with at least said high-frequency transformer and components constituting said single low voltage power source; and a second area formed between said video chassis and an inner surface of said housing at said first side of said housing, said second area being provided with other electronic components.

* * * * *